United States Patent
Steinberg

(10) Patent No.: US 8,312,557 B2
(45) Date of Patent: *Nov. 13, 2012

(54) SECURE STORAGE DEVICE FOR TRANSFER OF DATA

(75) Inventor: Eran Steinberg, San Francisco, CA (US)

(73) Assignee: Secure Storage Solutions, LLC, Portsmouth, NH (US)

(*) Notice: Subject to any disclaimer, the term of this patent is extended or adjusted under 35 U.S.C. 154(b) by 18 days.

This patent is subject to a terminal disclaimer.

(21) Appl. No.: 12/781,003

(22) Filed: May 17, 2010

(65) Prior Publication Data

US 2010/0262827 A1 Oct. 14, 2010

Related U.S. Application Data

(63) Continuation of application No. 12/164,608, filed on Jun. 30, 2008, now Pat. No. 7,748,049, which is a continuation of application No. 10/346,501, filed on Jan. 15, 2003, now Pat. No. 7,680,276, which is a continuation of application No. 09/105,593, filed on Jun. 26, 1998, now Pat. No. 6,510,520.

(51) Int. Cl.
*G06F 17/00* (2006.01)

(52) U.S. Cl. ........ 726/31; 380/201; 713/172; 348/231.9

(58) Field of Classification Search .................. 380/201; 726/31; 713/172; 348/231.9
See application file for complete search history.

(56) References Cited

U.S. PATENT DOCUMENTS

| | | |
|---|---|---|
| 5,027,401 A * | 6/1991 | Soltesz ........................ 380/54 |
| 5,150,407 A | 9/1992 | Chan |
| 5,325,430 A | 6/1994 | Smyth et al. |
| 5,428,685 A | 6/1995 | Kadooka et al. |
| 5,442,704 A | 8/1995 | Holtey |
| 5,442,706 A | 8/1995 | Kung |
| 5,467,396 A | 11/1995 | Schossow et al. |
| 5,499,294 A | 3/1996 | Friedman |
| 5,517,569 A | 5/1996 | Clark |
| 5,581,613 A | 12/1996 | Nagashima et al. |
| 5,623,637 A | 4/1997 | Jones et al. |
| 5,642,401 A | 6/1997 | Yahagi |
| 5,666,516 A | 9/1997 | Combs |
| 5,668,876 A | 9/1997 | Falk et al. |
| 5,677,953 A | 10/1997 | Dolphin |
| 5,689,563 A | 11/1997 | Brown et al. |
| 5,748,744 A | 5/1998 | Levy et al. |
| 5,751,809 A | 5/1998 | Davis et al. |

(Continued)

OTHER PUBLICATIONS

FlashPath SmartMedia Card Floppy Disk Adapter, Product Description, PC Mall, Publication Date Unknown [internet publication] URL: http://www.pcmall.com/pcmall/shop/detail.asp?d-pno=210863.

(Continued)

*Primary Examiner* — Eleni A Shiferaw
*Assistant Examiner* — Paul Callahan

(57) ABSTRACT

Described herein are methods and devices of securing data. For example, a method of securing data comprises receiving, by a secure storage device, unsecure data from a source. The secure storage device is removably attached to the source. The method further comprises securing the unsecure data within the secure storage device by performing digital processing related to the unsecure data to create secure data. The secure storage device is responsive to the same protocol as an unsecure storage device and as a result the secure storage device is transparent to the source. The source responds to the secure storage device as if it were an unsecure storage device.

24 Claims, 7 Drawing Sheets

U.S. PATENT DOCUMENTS

| | | | |
|---|---|---|---|
| 5,801,856 A | 9/1998 | Moghadam et al. | |
| 5,815,577 A | 9/1998 | Clark | |
| 5,862,217 A | 1/1999 | Steinberg et al. | |
| 5,878,142 A | 3/1999 | Caputo et al. | |
| 5,887,145 A | 3/1999 | Harari et al. | |
| 5,898,779 A | 4/1999 | Squilla et al. | |
| 5,987,136 A | 11/1999 | Schipper et al. | |
| 5,995,630 A | 11/1999 | Borza | |
| 6,094,724 A * | 7/2000 | Benhammou et al. | 726/20 |
| 6,223,190 B1 | 4/2001 | Aihara et al. | |
| 6,266,724 B1 | 7/2001 | Harari et al. | |
| 6,381,662 B1 | 4/2002 | Harari et al. | |
| 6,510,520 B1 | 1/2003 | Steinberg et al. | |
| 6,535,243 B1 | 3/2003 | Tullis | |
| 6,587,949 B1 | 7/2003 | Steinberg | |
| 7,137,011 B1 | 11/2006 | Harari et al. | |
| 7,748,049 B2 * | 6/2010 | Steinberg | 726/31 |

OTHER PUBLICATIONS

JP-10-105658 (Matsushita Electric Ind Co Ltd), abstract, Apr. 24, 1998 In: Patent Abstracts of Japan [online].

* cited by examiner

SECURE STORAGE DEVICE FOR TRANSFER OF DATA

RELATED APPLICATIONS

This application is a continuation of U.S. patent application Ser. No. 12/164,608, titled "SECURE STORAGE DEVICE FOR TRANSFER OF DIGITAL CAMERA DATA," filed on Jun. 30, 2008 (Now U.S. Pat. No. 7,748,049), which is a continuation of U.S. patent application Ser. No. 10/346,501, titled "SECURE STORAGE DEVICE FOR TRANSFER OF DIGITAL CAMERA DATA," filed on Jan. 15, 2003, (Now U.S. Pat. No. 7,680,276), which is a continuation of U.S. patent application Ser. No. 09/105,593, titled, "SECURE STORAGE DEVICE FOR TRANSFER OF DIGITAL CAMERA DATA," filed on Jun. 26, 1998 (Now U.S. Pat. No. 6,510,520 issued Jan. 21, 2003,) the entire disclosures of which are here incorporated by reference.

BACKGROUND OF THE INVENTION

1. Field of the Invention

The present invention relates generally to digital still and video cameras and the transfer of data from a digital camera to a computer, and more particularly to an apparatus for transparently providing embedded security of data within a storage device and of securing data while being transferred from a digital camera to a computer.

2. Brief Description of the Prior Art

In many applications, photographic data needs to be guarded or i.e. secured against unauthorized viewing, modification or distribution. Negatives, positives and prints can be manipulated with some effort, and need protection when used to accurately document images. In such a case, the original negatives and prints are typically kept in locked facilities, with signed, sealed and witnessed chains of custody. The advent of digital cameras presents even greater security challenges. The concept of an original digital image is questionable, because digital data can be perfectly replicated. In addition, digital image data can be quickly and easily modified in a computer, rendering the data useless for evidentiary purposes. Currently, digital camera image data is downloaded either directly to a computer from a camera via some communication mechanism, or through a removable storage device, such as a PCMCIA card, etc. Upon downloading the data to a computer, the image data can be encrypted, or authentication data can be created to prevent an unauthorized person from modifying the data. From this point on, a witnessed chain of custody of those persons with access to the decryption key can be maintained, greatly easing the security problem. From the above description of the prior art, it is apparent that there is a need for a method and apparatus for securing camera data automatically prior to, or as part of downloading image data from a camera. Such a method and apparatus would greatly improve the security of digital camera data.

SUMMARY OF THE INVENTION

It is therefore an object of the present invention to provide a method and apparatus for securing data from digital still and video cameras during the process of transferring the data from a camera to a computer.

It is a further object of the present invention to provide a secure storage device for digitally saving data from a digital camera.

It is a further object of the present invention to provide a method and apparatus for securing data from still and video cameras during the process of transferring data from a camera to a computer, wherein the securing process is undetected by or i.e. transparent to the camera, and therefore providing a method and apparatus that can be used with any digital camera.

It is a further object of the present invention to provide a secure storage and/or communication device that automatically encrypts loaded digital camera data.

It is another object of the present invention to provide an apparatus with dimensions and connectors in the form of a PCMCIA card that is accepted by a digital camera and a destination computer as a standard PCMCIA card, while performing the function of automatically securing loaded digital camera data.

It is a still further object of the present invention to provide a secure storage and/or communication device that can be programmed with a security key, that automatically stores loaded original digital camera data, and prepares encrypted authentication data.

It is another object of the present invention to provide a secure storage and/or communication device that inserts information into loaded digital camera image data, i.e. performs fingerprinting.

It is a further object of the present invention to provide a secure storage and/or communication device that includes additional information along with the image data, i.e., provides annotations, such as the absolute time of acquisition, a unique and continuous image counter, and a unique image and device identification number.

Briefly, a preferred embodiment of the present invention includes a secure storage device with the external dimensions of a PCMCIA card, for securing digital camera data at the acquisition stage. Original digital camera data is saved in the memory of the secure storage device which has the capability of performing one or more security functions, including encryption, creation of an authentication file, adding data to the image data such as fingerprinting, and adding secure annotations such as separate data included in an image header. The device prepares original authentication data from original digital camera data, and encrypts and stores both the original authentication data and the original image data. The use of the device includes downloading the original image data to a first computer, and encrypted original authentication data to a second computer. The second computer can be programmed with software whereby the encrypted original authentication data can be decrypted by a user having a key. The software then allows the user to prepare corresponding second authentication data from second image data of questionable authenticity. If the second authentication data is the same as the original authentication data, the questionable second image data is deemed to be an accurate copy of the original image data.

An advantage of the present invention is that it provides a method and apparatus for securing data while storing and transferring otherwise unsecured image data received from a digital camera for transfer to a computer.

A further advantage of the present invention is that it provides a method and apparatus for securing the chain of custody of digital data from cameras that would otherwise provide only unsecured image data.

Another advantage of the present invention is that by putting the security function in a removable storage device, the storage can be customized for a particular user with no need for special hardware on the camera or the PC, enabling the retrofitting of otherwise unacceptable cameras with appropriate security functionality.

A still further advantage of the method and apparatus of the present invention is that the processing provided is undetected i.e. transparent to the camera and to the computer, and as a result the method and apparatus can be applied to any digital camera, and also to a variety of other devices that utilize peer to host and peer to peer communication and/or removable storage.

IN THE DRAWING

DESCRIPTION OF THE PREFERRED EMBODIMENT

Figure 1:
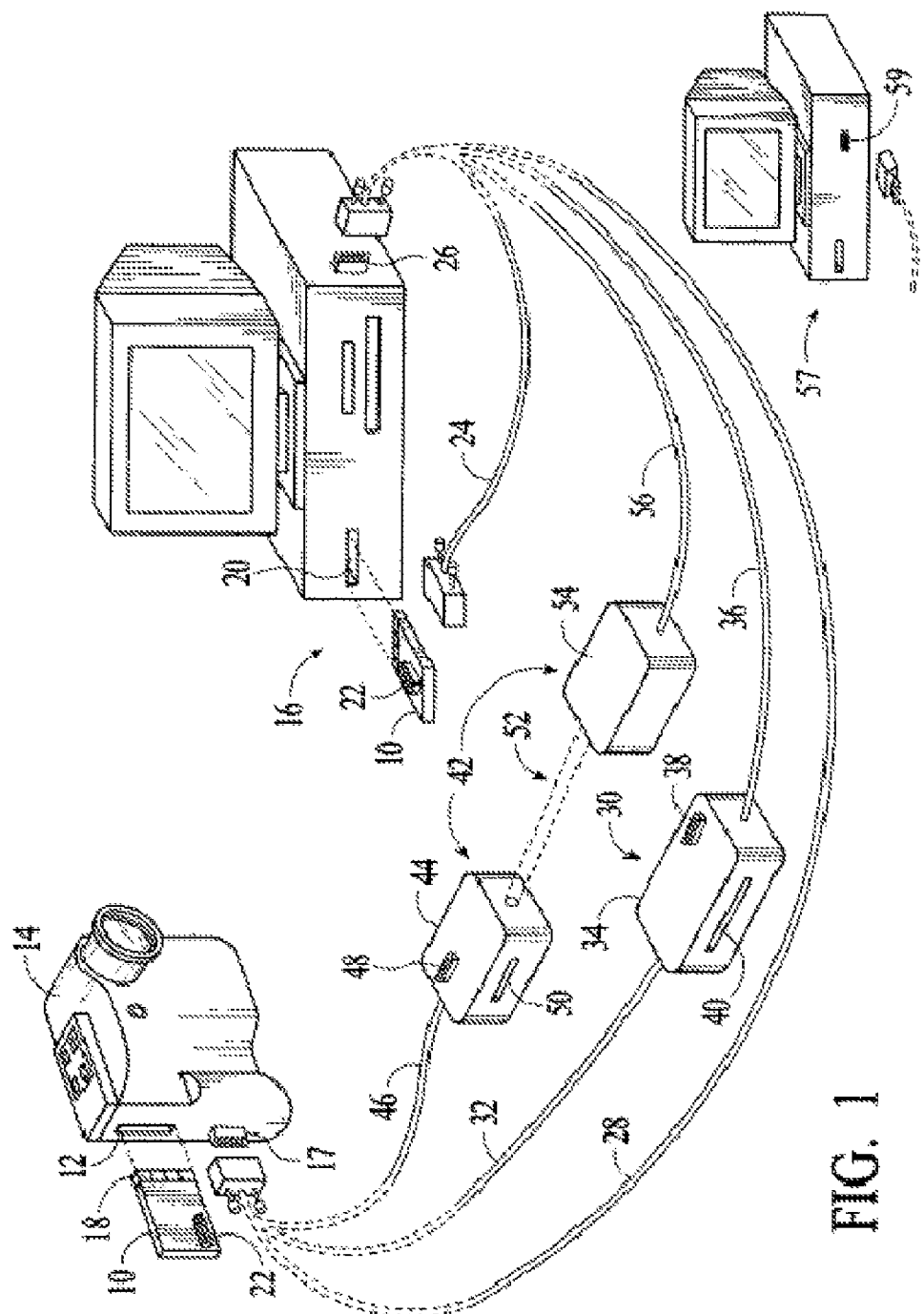
FIG. 1 is a perspective view illustrating the use of the present invention to transfer data.

Referring now to FIG. 1 of the drawing, the method and apparatus of the preferred embodiment of the present invention is illustrated. The preferred embodiment includes an electronic digital signal processing apparatus, referred to as a secure storage device 10, and configured to physically engage with a PCMCIA card slot 12 of a prior art digital camera 14. Although the camera 14 shown is typical in appearance to a still camera, the method and apparatus also applies to motion picture/video cameras.

According to the method of the present invention, the device 10 is initially programmed to receive data from a digital camera, without the need of a password/key from the camera, and to perform the required processes to secure the data from the camera 14. The initial programming of device 10 can be either fixed, one time programming of a ROM, and/or it can be a program downloaded by a user from a PC such as PC 16. This programming data, as well as additional data, can be loaded into device 10 through the PCMCIA terminal 18 from a corresponding PCMCIA slot 20 in the PC 16. Alternatively, the device 10 can receive data through an input port 22 connected for example with a cable assembly 24 to a compatible port 26 of PC 16. The device 10 can be programmed to perform any of a variety of processes to secure the data, including encryption of image data, and/or creation of encrypted image authentication data, or watermarking, etc.

In operation, the programmed device 10 is inserted in slot 12 of the still/video camera 14. When the device 10 receives data from the camera 14, it performs the programmed operations and stores the data. The device 10 is then removed from the camera 14 and inserted into the PCMCIA slot 20 of the computer 16. The device 10 is configured so that the PC 16 recognizes the device 10 as a regular storage device with readable files on the file system level without the need for presenting a password. The secure data is then transferred from the device 10 to the computer 16. In order for a user to view encrypted data, the computer 16 must be programmed to decrypt the data, generally in response to entry of a password.

Referring again to FIG. 1, according to the prior art, a digital camera 14 is connected to a computer 16 by way of a direct cable connection indicated by line 28 making a direct cable connection from the camera connector 29 to the PC connector 26. In this manner, unsecure camera data is directly transferred to a PC 16. An unauthorized user could then easily modify the data with the PC 16. The method and apparatus of the present invention solves this problem by first transferring the camera data to the secure storage device 10, which automatically secures the data. Two alternate embodiments of the present invention are also shown in FIG. 1.

A first alternate embodiment includes a secure data transfer device 30 having an input cable assembly 32 for making a connection from the camera 14 connector 29 to a security device 34. The security device 34 performs the same or similar operations as those discussed in reference to device 10 for securing the image data, and outputs the data to the PC 16 through an output cable 36, which in operation is connected to connector 26 of PC 16. The device 34 is programmable, and can receive additional data in the same manner as device 10, by connection to a computer through either cable assembly 32 or 36, or alternatively through a connector 38, or by way of a PCMCIA card through a PCMCIA card slot 40.

The second alternative embodiment, also shown in FIG. 1, includes a wireless secure data transfer device 42, including a security device 44 that can be connected to a camera 14 by way of a cable assembly 46. The device 42 is programmable and receives additional data either from a PC through cable assembly 46 or connector 48, or by way of a PCMCIA card through slot 50. The device 44 includes a transceiver having a modulated infrared transmitter portion for generation of an infrared signal 52 for transmission of data to an infrared transceiver 54 which receives and demodulates the signal, and outputs the data to the computer 16 through a cable assembly 56. The transceiver properties of device 44 and transceiver 54 in addition allow for programming and other data to flow from PC 16 to device 44 through the wireless infrared connection.

In all of the above embodiments, the devices 10, 30 and 42 present a standard interface to the camera 14 and PC 16. From the camera's point of view, the communication appears as if a direct connection is made to the PC. Similarly, the PC observes a connection that appears to be directly to the camera. This feature of transparency of the devices 10, 30, 42 allows the apparatus and method of the present invention to apply to any digital camera and any PC that is programmed to receive digital camera data. The security is performed inside the device 10, 30, 42 and has no effect on the camera or PC.

The computer 16 of FIG. 1 represents a destination to which the camera data is being transferred. Although a PC is illustrated, this destination can be any computerized network, system, etc. capable of receiving the data. FIG. 1 also shows a second destination 57 with a data input connection 59. The second destination 57 is shown to illustrate an important alternate embodiment of the method of the present invention, wherein a user can hook the output of device 10, 30, or 42 to a first destination 16 to download a first set of data, for example encrypted authentication data, and then to the second destination 57 to download a second set of data, which for example could be authenticated image data.

Figure 2:
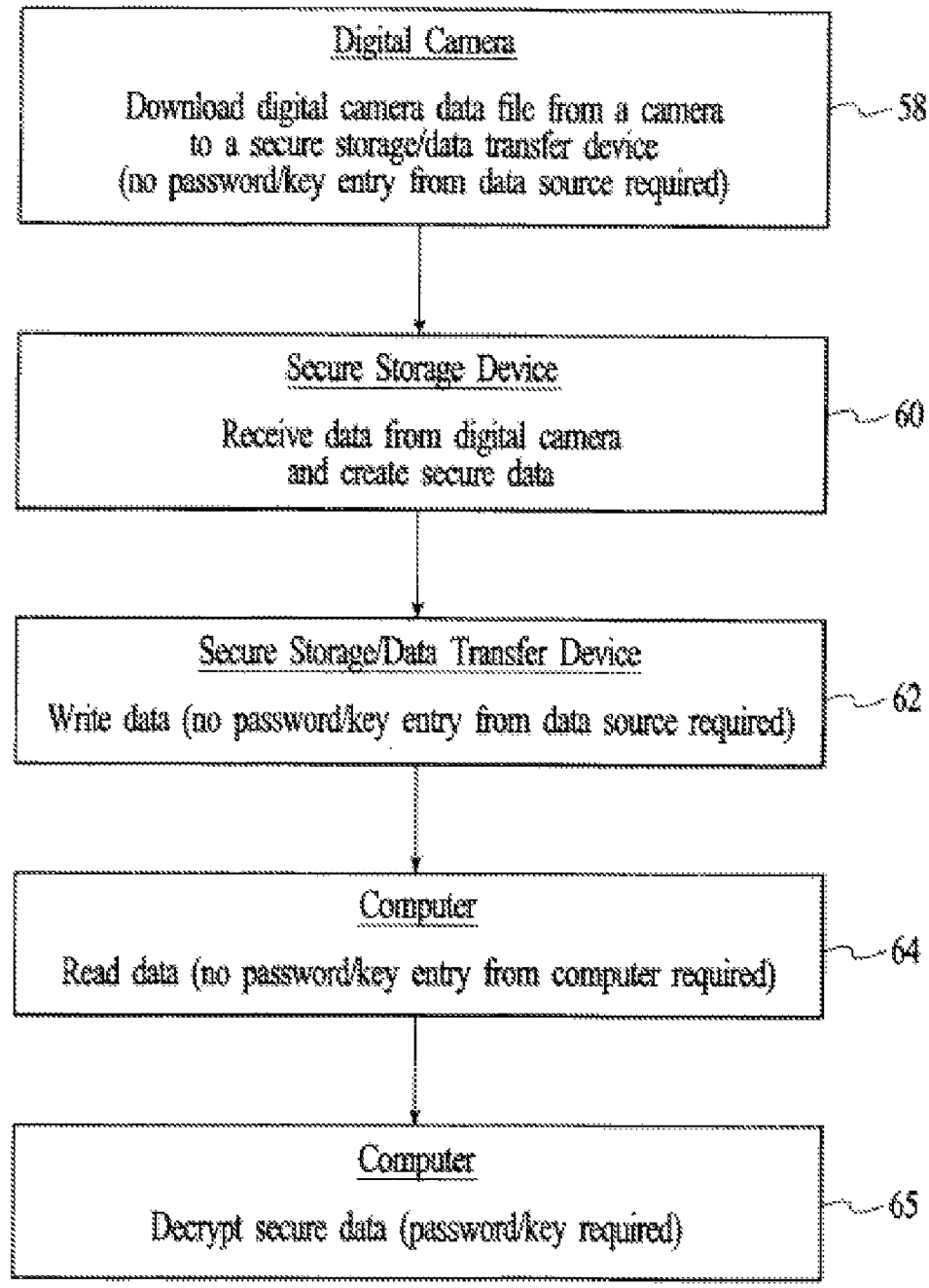
FIG. 2 is a block diagram showing the method steps of secure data transfer.

FIG. 2 shows the basic process in block form. Block 58 includes the operation of a digital camera writing original digital camera data to a secure storage device without the need for presenting a password. This data is received by the storage device and secured (block 60), a process requiring a pre programmed key. The storage device then writes the secured data (block 62), again without requiring the receipt of a password, which is read by the computer (block 64). In this operation it is assumed that the user has loaded the required operating software into the computer. The user must then present a password/key to the computer in order to decrypt the secure data or perform an authentication operation (block 65).

It is important to point out here that the storage device described herein presents an external behavior/interface to the camera that appears to the camera to be the same as the prior art devices into which the camera is designed to download data. A major distinction between the prior art storage devices designed and used for digital cameras and the secure device of the present invention is that the disclosed device upon receiving data/information, performs operations to secure the data. This is done without requiring a password or key from the camera, which is an important feature of the present invention. Similarly, a computer can receive the secure data from the storage device without presenting a password/key. Once the secure data is loaded in the computer, a key must be presented in order to decrypt the secure data.

The advantage of this method is that no special programming or apparatus, other than the secure storage device, is required in order to securely transfer data from a conventional prior art digital camera to a computer.

The preferred external physical configuration of the secure storage device is that of a standard PCMCIA card, for example device 10 of FIG. 1 without the connection 22. In this configuration, neither a user nor the camera nor a computer can distinguish the secure storage device from a standard PCMCIA card. The device accepts data from a camera, and sends data to a computer using standard protocol as if the device is a regular PCMCIA card. The only difference is that the data is secured through any of various means which will be described in the following specification, such as encryption, authentication, etc. A user's only clue concerning the unique nature of this device is that encrypted data loaded into a computer from the device will not be intelligible until decrypted, a process requiring special software in the computer, including a password and/or key. A point of novelty illustrated in FIG. 2 is that no password or key is required either to download data from the camera to the device, or from the device to a computer, as indicated in blocks 58, 62 and 64. This method allows maximum security of data, while allowing use of a standard digital camera and computer for all phases except the find step (block 65), wherein the user must load appropriate software with a key into the computer for decryption of the encrypted data.

Other physical embodiments of the secure storage device are as illustrated and discussed in reference to FIG. 1. In addition, the device 10 can alternatively be a SSFDC (Smart Media) card, or flash card, etc.

Figure 3:
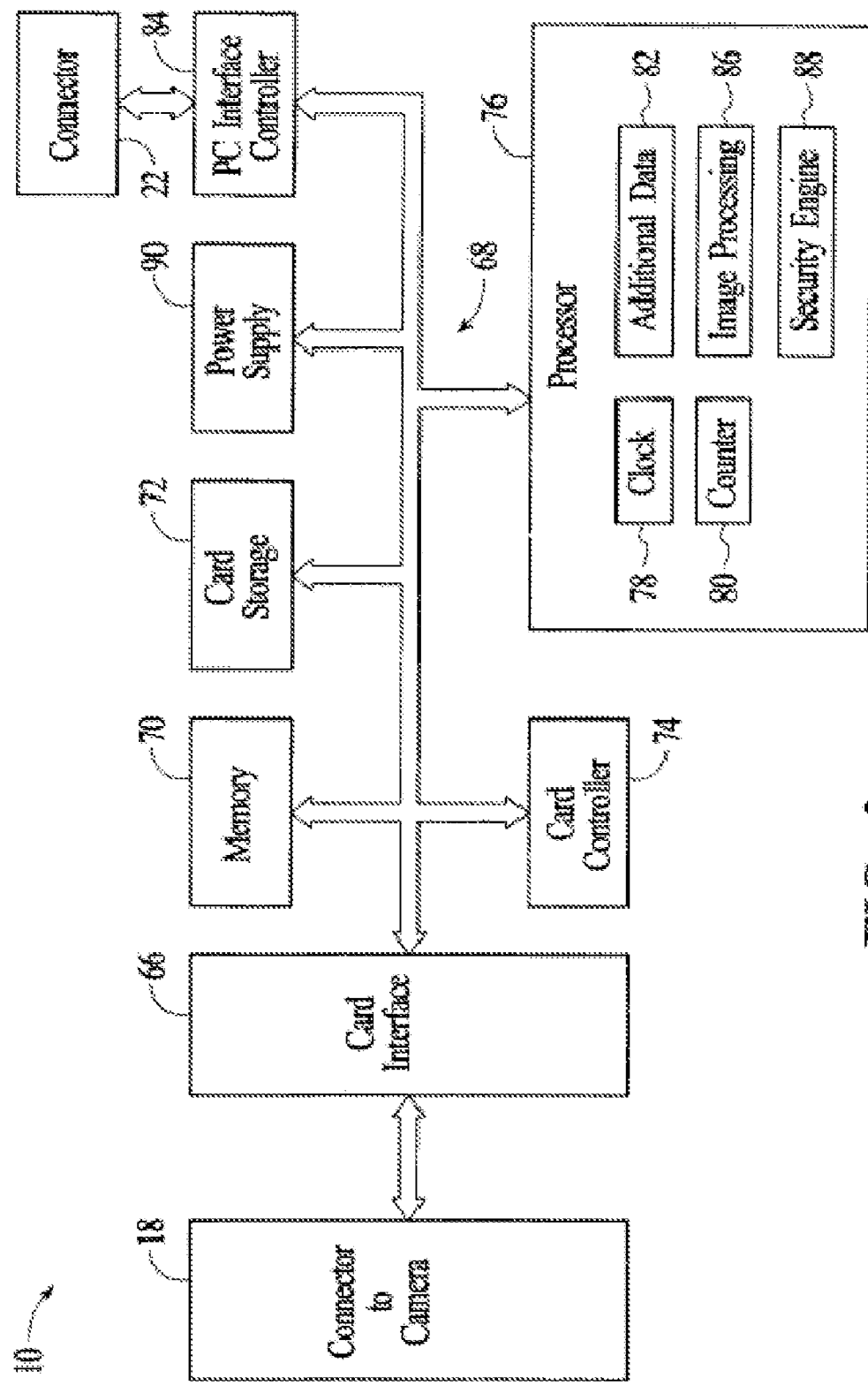
FIG. 3 is a block diagram of a secure storage device.

FIG. 3 illustrates typical circuit blocks required within the device 10. The connector/connection 18 passes data from the camera 14 to a card interface 66 providing the necessary protocol for communication with the camera. Bus line 68 interconnects the various circuit blocks as required. This is a memory 70, which can include a EEPROM and/or a ROM and RAM as required in a particular design. The card storage block 72 indicates the use of a floppy disk, or mini disk, etc for retaining the data for storage and transfer to a computer. Card controller 74 performs the standard/usual card operations, with additional processes accomplished by processor 76, which preferably includes a clock 78, counter 80, and facility for receiving additional data (block 82) from a PC through either of connectors 18 or optionally through PC interface controller 84 from connector 22. The processor also performs image processing activity 86 including security process 88. The power supply 90 is included as optional in design, including a clock, for example, or where power cannot be obtained from the camera and computer.

Figure 4:
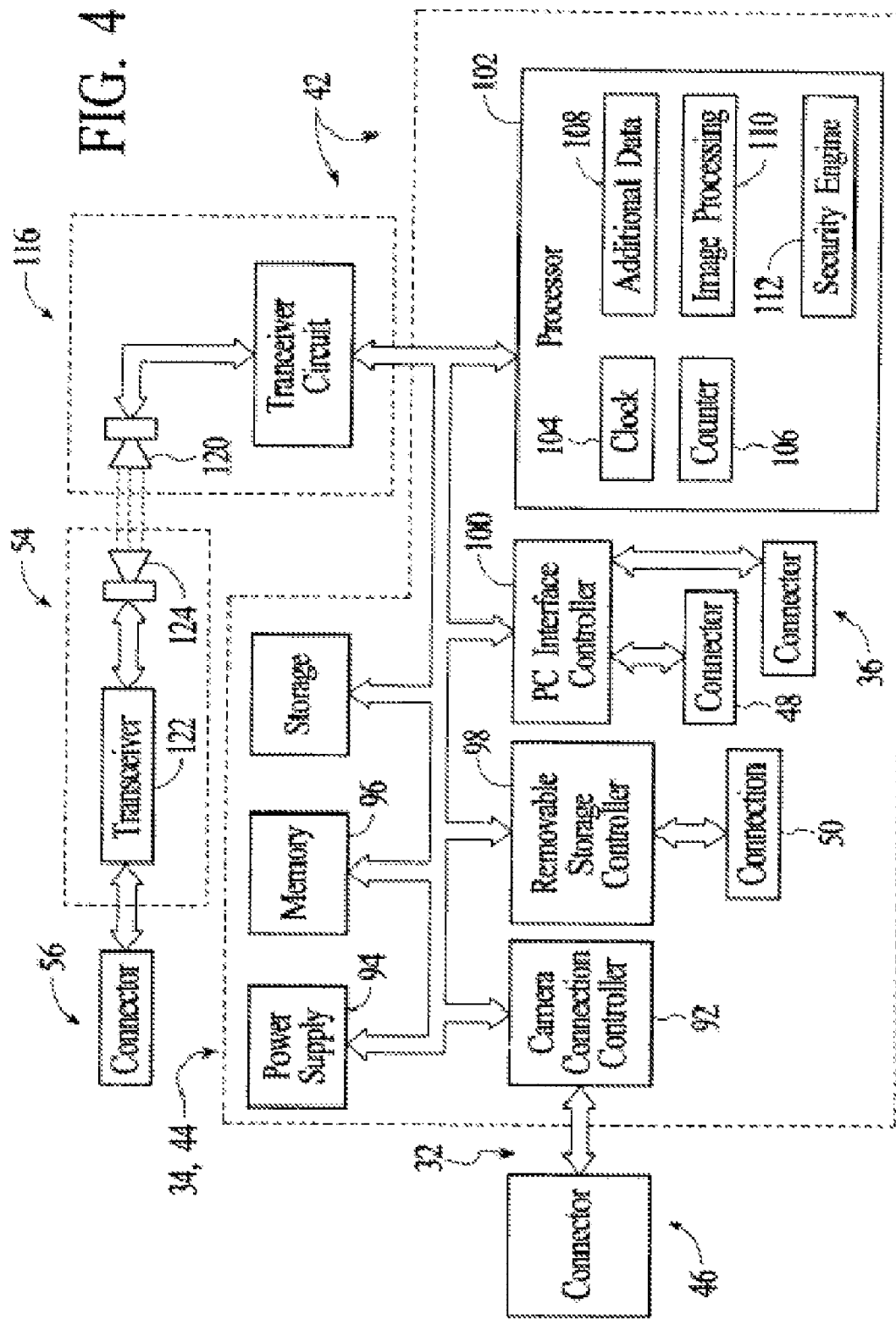
FIG. 4 is a block diagram of a secure data transfer device.

FIG. 4 illustrates typical circuit block functions for devices 30 and 42. Device 30 includes cable connector assemblies 32 to a camera and 36 to a computer, and security device 34. Device 42 includes the cable connector assemblies 46 and 56, and security device 44 which includes the circuitry in security device 34 with transceiver circuitry 54 added, and the separate transceiver 54.

The device 34 circuitry includes a camera connection controller 92, power supply 94, memory 96, a removable storage controller 98 providing interface to card connection 50, a PC interface controller 100 providing interface to cable connector assemblies 48 and 36, a processor 102 with a clock 104, counter 106, additional data 108, image processing 110 and a security engine 112. The storage 114 is optional for the data transfer devices 30 and 42, and is for storing the data to be transferred from a camera to a computer, and can be a floppy disk, mini disk, etc. Since the use of the devices 30 and 42 preferably involves connecting to both the camera and destination at the same time, data can normally be transferred quickly enough so that memory 96 can provide adequate storage/buffering. If applications require longer storage, the optional storage 114 can be included in the design.

Figure 5:
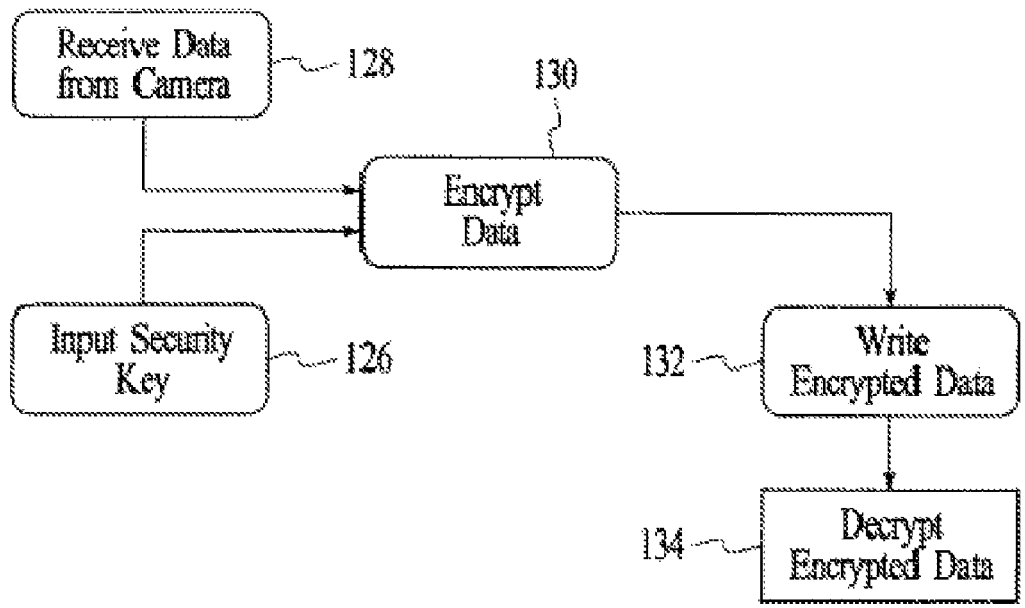
FIG. 5 illustrates the transfer of secure data by way of data encryption.

FIG. 5 illustrates the processes of the secure storage devices 10, 30, 42 for encryption of original digital camera data. According to the process, the storage device is initially programmed with a security key (block 126). This operation is done as an initial set-up of the device, prior to it's normal usage. This key programming can be a permanent setting, or it can be programmable. With the devices 10, 30, 42 ready for normal use, it is then connected to a camera and receives original digital camera data (block 128). The device then encrypts the original digital camera data (block 130). Following this, the device is removed from the camera and connected to a computer loaded with compatible software. The device 10, 30, 42 then writes the data to a computer (block 132). A user knowing the security key can then operate the computer to decrypt the encrypted data (block 134). As explained in reference to the method indicated in FIG. 2, the device 10, 30, 42 does not require receipt of a password/key to receive data from a camera, or to download data to a computer. The key is used in the encryption process and is only a factor when a user desires to view the original data through use of the computer.

Figure 6:
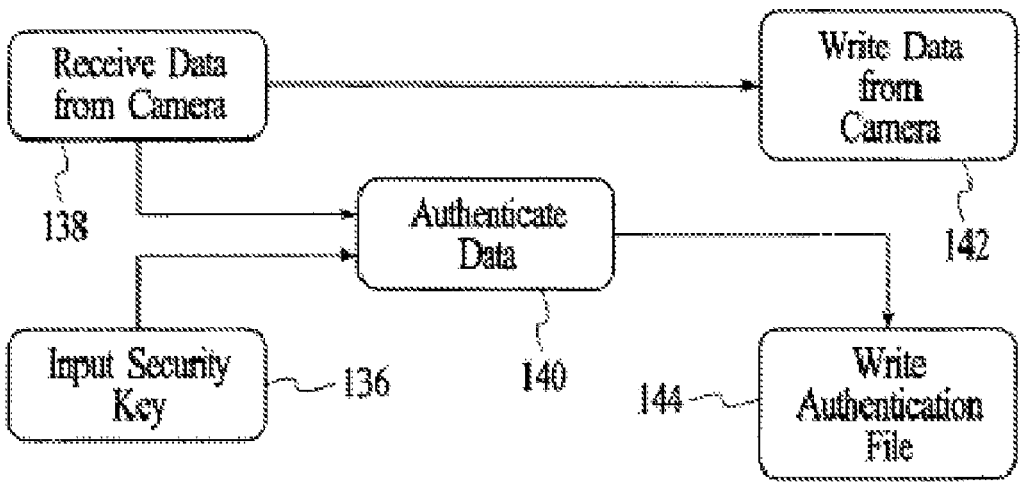
FIG. 6 illustrates the storage device for secure data transfer through creation of authentication data.

A secure storage device can also be programmed to create authentication data. This is illustrated in FIG. 6. As in the case of FIG. 5, the storage device is initially programmed with a security key (block 136) prior to use of the device. The device is then connected to a camera to receive original camera data (block 138). Authentication data is then created within the storage device from the original camera data and then encrypted (block 140).

Figure 7:
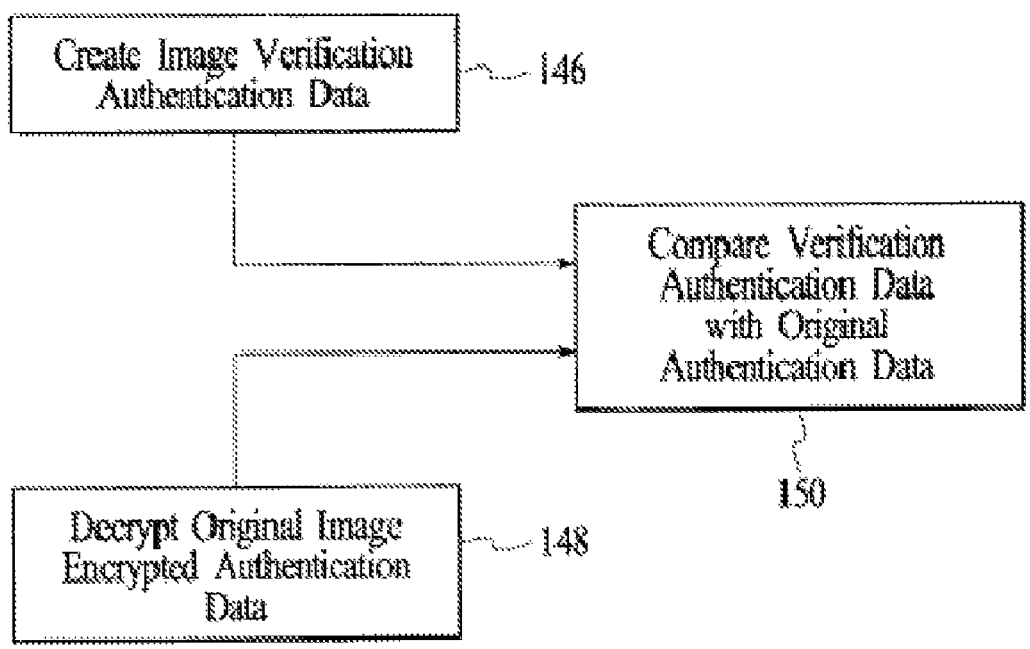
FIG. 7 illustrates the process of a host computer for verifying image data authenticity through use of authentication data.

Any person can then download the camera data, i.e. cause the storage device to write the camera data (block 142), and authentication data/file (block 144) to a computer. This completes the function of the storage device. The user can then proceed to use the computer as indicated in FIG. 7 to verify the authenticity of a set of questionable data. The user first uses appropriate software and the key to create verification authentication data from the questionable image data file (block 146), and decrypts the encrypted original authentication data (block 148). The two sets of data are then compared (block 150). If they are the same, the questionable image data is considered valid, i.e. an accurate replica of the original image data. If the two sets are different, the questionable data is confirmed to be different from the original.

Figure 8:
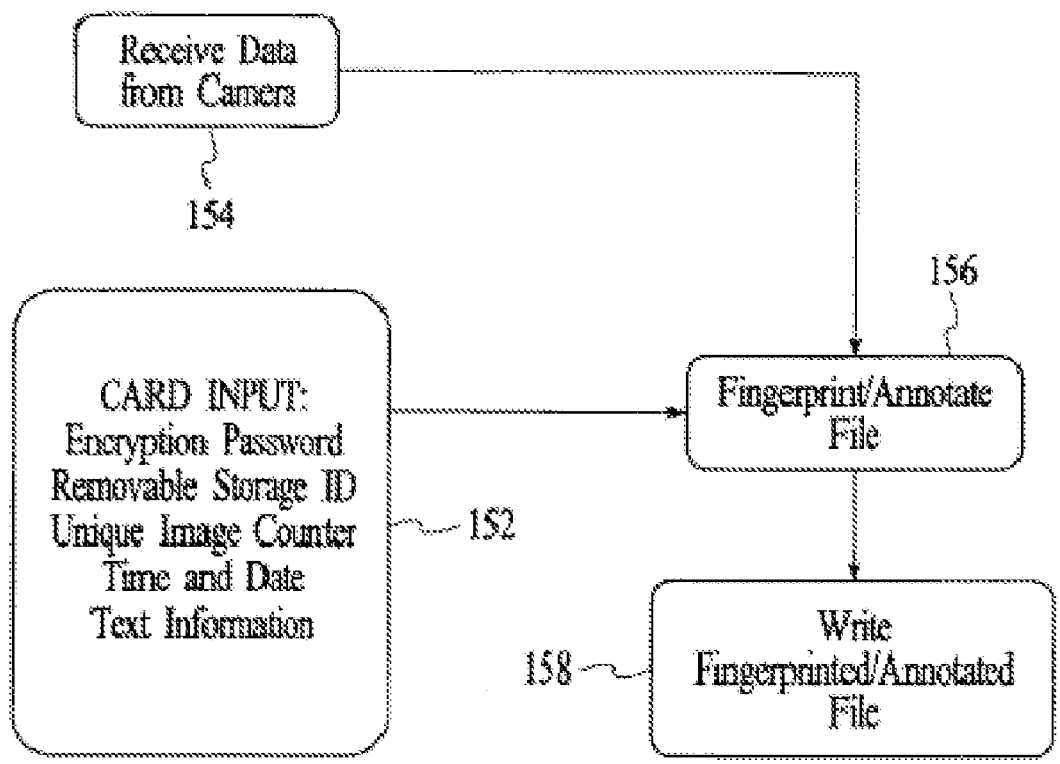
FIG. 8 shows a method of secure data transfer by way of fingerprinting and/or annotation.

FIG. 8 illustrates two similar processes called "fingerprinting" and "annotating". Fingerprinting is a process wherein additional information is visibly or invisibly inserted into the image data itself. Examples of additional information that can be added include the camera serial number, date and time, unique counter, image storage ID, and any textual information that is downloaded to the storage device prior to receiving the camera image data. The process of annotation is similar to fingerprinting, except that the information is placed in a non-image area such as the header, rather than in the image data. Referring to FIG. 8, the storage device is connected to a computer and the required data is inputted, i.e. downloaded (block 152). This can be done through connection 18 for a PCMCIA card configured device 10, or through connector 22 of the alternative device 10. Device 42 is configured as indicated in FIG. 4 to receive data through port 48 or through cable assembly 46 or through cable assembly 50 from a PC, or through port 56 from a PC, or through port 50 from a PCMCIA card. Similarly, device 30 is configured to receive data alternatively through cable assembly 32 or 36, or connector 38 from a PC, or through port 40 from a PCMCIA card. The storage device is then connected to a camera and receives camera data, i.e. camera data is downloaded (block 154). The device then performs programmed processes of either fingerprinting the data or annotating the data file (block 156) depending on the specific programming of the storage device. The storage device is then removed from the camera, connected to a computer, and the data is written, i.e. downloaded to the computer (block 158). As explained above, this is all done without the presentation of a password or key from the camera or computer. Once the data is in a computer, however, the original data or authentication requires submission of a password/key.

Figure 9:
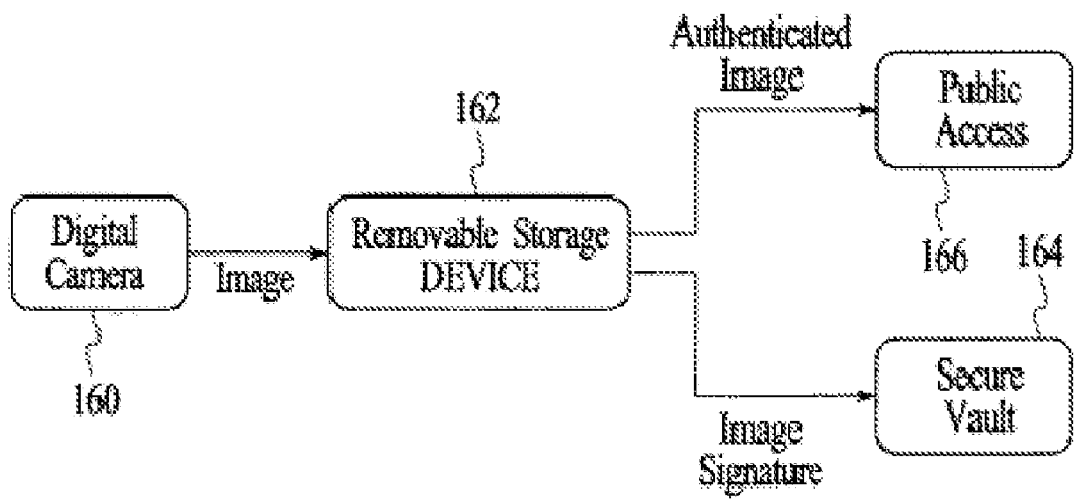
FIG. 9 illustrates the sending of secured data from a secure storage device to a first location, and public data to a second location.

In some cases, it is preferred to keep a signature file or authentication file in a secure, private location, and allow public access only to an authenticated image. These processes are illustrated in FIG. 9, wherein image data is downloaded from a camera 160 to a secure storage device 162, which performs the required security functions. The device 162 then downloads the image security data to secure location 164, and an authenticated image to public access 166.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of securing data comprising:
   receiving, by a secure storage device, unsecure data from a source, the secure storage device removably attached to the source; and
   securing the unsecure data within the secure storage device by performing digital processing related to the unsecure data to create secure data, wherein the secure storage device is responsive to the same protocol as an unsecure storage device and as a result the secure storage device is transparent to the source, wherein the source responds to the secure storage device as if it were an unsecure storage device.

2. A method as recited in claim 1 further comprising transferring the secure data from the secure device to a computer in response to receiving a password for the secure data.

3. A method as recited in claim 1 further comprising: loading the secure device with additional data; and storing the additional data in the secure device.

4. A method as recited in claim 3 wherein the secure data includes annotations taken from the additional data and added to a non-image area.

5. A method as recited in claim 3 wherein the additional data includes encrypted data.

6. A method as recited in claim 3 wherein the secure data includes fingerprinted data, wherein the fingerprinted data includes additional data added to the source data.

7. A method as recited in claim 3 wherein the additional data includes the time and date of at least one of taking a picture and writing the data to the secure storage device.

8. A method as recited in claim 3 wherein the additional data includes a unique device identification.

9. A method as recited in claim 1 further comprising inputting a security key to the secure storage device.

10. A method as recited in claim 1 wherein the secure data is encrypted data.

11. A method as recited in claim 1 wherein the secure data includes encrypted authentication data.

12. A method of securing data comprising:
    receiving, on a security device, unsecure data from a source through an input means, the security device having an output means for connecting to a destination and being removably attached to the source;
    securing the unsecure data within the security device to create secure data; and
    transferring the secure data from the security device through the output means to the destination, wherein a transmission protocol for the downloading receiving is a same protocol as used in standard communication to and from the source and as a result the security device is transparent to the source and the computer, whereby the computer and the source respond to the security device as if it were an unsecure device.

13. A method as recited in claim 12, wherein the destination is a computer.

14. A method as recited in claim 12, wherein the input means includes including first cable means for connecting the source to the security device.

15. A method as recited in claim 12, wherein transferring the secure data from the security device through the output means to the destination occurs in response to receiving a password for the secure data.

16. A method as recited in claim 12, further comprising: loading the security device with additional data; and storing the additional data in the security device.

17. A method as recited in claim 16, wherein the secure data includes annotations taken from the additional data, and the method further comprises adding the annotations to a non-image area.

18. A method as recited in claim 16, wherein the secure data includes fingerprinted data, and the fingerprinted data includes additional data added to the source data.

19. A method as recited in claim 16, wherein the additional data includes data indicating a unique single step image counter number for the source in the security device.

20. A method as recited in claim 16, wherein the additional data is data indicating a unique identification of the security device.

21. A method as recited in claim 12, further comprising inputting a security key to the security device.

22. A method as recited in claim 12, wherein the secure data is encrypted.

23. A method as recited in claim 12, wherein the secure data includes encrypted authentication data.

24. A secure storage device comprising:

a transceiver for receiving, by a secure storage device, unsecure data from a source, the secure storage device removably attached to the source; and a security engine for securing the unsecure data within the secure storage device by performing digital processing related to the unsecure data to create secure data, wherein the secure storage device is responsive to the same protocol as an unsecure storage device and as a result the secure storage device is transparent to the source, wherein the source responds to the secure storage device as if it were an unsecure storage device.

* * * * *